United States Patent

Weigand et al.

[11] Patent Number: 5,528,666
[45] Date of Patent: Jun. 18, 1996

[54] PERSONAL PHONE EXPANSION SYSTEM

[75] Inventors: David L. Weigand, Buffalo Grove; Ralph D. Smallwood, Sleepy Hollow; Matthew W. Taylor, Wheeling, all of Ill.

[73] Assignee: Motorola, Inc., Schaumburg, Ill.

[21] Appl. No.: 269,594

[22] Filed: Jul. 1, 1994

[51] Int. Cl.$^6$ .................................................. H04Q 7/30
[52] U.S. Cl. .................................................. 379/58; 379/61
[58] Field of Search ..................... 379/58, 59, 61, 379/88, 67; 381/42, 94, 29, 73.1; 455/76, 77, 33.1, 54.1; 375/242; 370/58.1, 77, 97, 109

[56] References Cited

U.S. PATENT DOCUMENTS

| | | | |
|---|---|---|---|
| 4,726,050 | 2/1988 | Menich et al. | 379/60 |
| 4,771,448 | 9/1988 | Koohgoli et al. | 379/60 |
| 4,782,510 | 11/1988 | Szlam | 379/88 |
| 4,802,235 | 1/1989 | Treatch | 455/76 |
| 4,815,128 | 3/1989 | Malek | 380/9 |
| 4,989,230 | 1/1991 | Gillig et al. | 379/59 |
| 5,177,780 | 1/1993 | Kasper et al. | 379/59 |
| 5,193,110 | 3/1993 | Jones et al. | 379/94 |
| 5,247,567 | 9/1993 | Hirano | 379/61 |
| 5,289,529 | 2/1994 | Karnowski | 379/88 |
| 5,291,479 | 3/1994 | Vaziri et al. | 370/58 |
| 5,365,573 | 11/1994 | Sakamoto et al. | 379/61 |

FOREIGN PATENT DOCUMENTS

| | | |
|---|---|---|
| 0219085A2 | 4/1987 | European Pat. Off. |
| 0342707A2 | 11/1989 | European Pat. Off. |
| 2252699A | 8/1992 | United Kingdom |
| 2279849A | 1/1995 | United Kingdom |

Primary Examiner—Curtis Kuntz
Assistant Examiner—Michael B. Chernoff
Attorney, Agent, or Firm—Dale B. Halling; Donald C. Kordich

[57] ABSTRACT

A personal phone expansion system (10) includes a personal base station (12) and a plurality of portable units (18). The personal base (12) is connected to a phone line (16) and provides routing and switching between the phone line (16), the portable units (18), a full duplex speaker phone (24), and a voice messaging system (26). The voice messaging system (26), which is contained within the personal base station (12) provides full voice mail functions. The personal base station (12) communicates with the portable units (18) by radio signals through a wireless interface (32). The portable units (18) can be used as standard cellular telephones when outside the range of the personal base station (12).

8 Claims, 2 Drawing Sheets

5,528,666

PERSONAL PHONE EXPANSION SYSTEM

FIELD OF THE INVENTION

The present invention relates generally to the field of telephone systems, and more particularly to, private telephone systems.

BACKGROUND OF THE INVENTION

The consumer is presented with a wide variety of choices to enhance his home or office telephone system. If the consumer does not wish to be limited by the length of a telephone cord he can purchase a cordless telephone. This will provide the consumer with a roaming range of about 50 feet. If this is inadequate, the consumer can buy a cellular telephone to provide a virtually unlimited roaming range. However, the extra cost for cellular air time dictates that most consumers have a cordless telephone for their home and cellular telephone when they are away from home.

The consumer can further enhance his phone service by having additional phone lines coming into his house. In this way he can receive or place two phone calls at one time. This also allows the consumer to place a call to a second phone in his house. Unfortunately, the cost of adding a second phone line is non-trivial. Alternately, the consumer can have multiple phones connected to the same phone line. This solution does not allow the consumer to place a call from say the basement phone to the second floor phone.

The consumer can purchase an answering machine, which will automatically answer the phone when consumer is not at home or does not want to be disturbed. Answering machines are limited, in that a person wishing to leave a business message for one member of the household cannot ensure that it will not be heard by another member of the household. In addition, every member of the family has to listen to all the messages to find out if any of the message were intended for them.

Phone companies and others provided voice mail systems where messages can be left in individual mail boxes. These mail boxes can be accessed individually and often require an access code. While this solves some of the problems inherent in answering machines, the companies charge a monthly fee that adds up over time.

A speaker phone is another device a consumer can add to enhance his phone service. Speaker phones allow hands free operation of the phone, which can be helpful when looking over and discussing documents or for conference call capabilities. Speaker phones experience feedback from the speaker to the microphone, unlike conventional handsets. This has been solved by having a signal activated switch which only allows either the speaker or the microphone to be working at any one time. This is known as a half duplex system. Even though the switch works automatically it does not allow for the free flowing conversation of a standard telephone.

Thus there exists a need for a system which can solve these and other problems encountered in home telephone systems.

DETAILED DESCRIPTION OF THE PREFERRED EMBODIMENT

Figure 1:
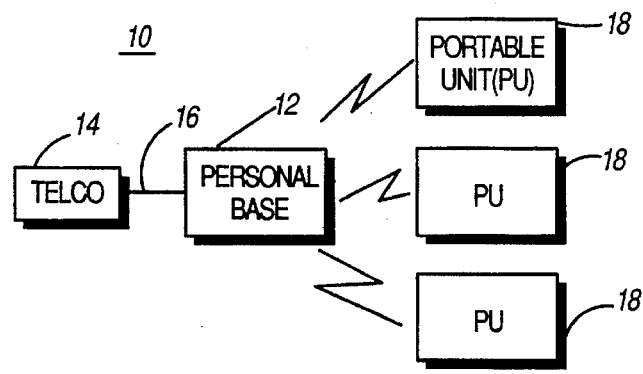
FIG. 1 is a block diagram of a personal phone expansion system configured in accordance with the present invention.

A personal phone expansion system 10, shown in FIG. 1, consists of a personal base station 12 connected to a public telephone company (TELCO) 14 by a phone line 16 (Public Switched Telephone Network, interface). The TELCO 14 provides access to a public switched telephone network (PSTN). A plurality of portable units 18 or handsets are provided with the system. The portable units 18 are used by a person to communicate voice or data from one of the portable units 18 to a user connected to the PSTN or to another of the portable units 18 or to the personal base station 12. In order to accomplish this the portable unit 18 communicates with the personal base station 12 using radio signals. The portable units 18 may be configured so that they act as standard cellular telephones when outside the range of the personal base 12.

Figure 2:
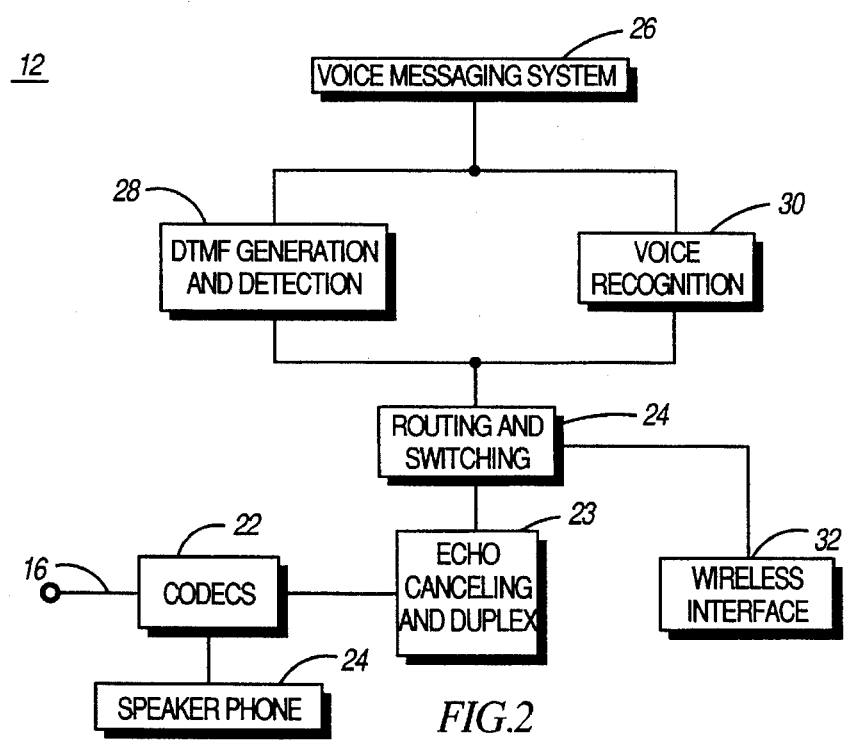
FIG. 2 is a block diagram of a personal base station of the personal phone expansion system shown in FIG. 1.

The personal base 12 has a plurality of codecs 22 (see FIG. 2) to digitize analog signals from the phone line 16 or a speaker phone 24 and to convert the digital signals to the phone line 16 or the speaker phone 24 to analog. One codec is required for every analog input, i.e. analog phone line or speaker phone. If the phone line 16 carries digital signals, then the codec 22 would not be required for that phone line.

The codecs 22 are connected to an echo canceling and duplex circuit 23. The echo canceling and duplex circuit 23 can perform both electrical and acoustical echo cancellation. Acoustical echo cancellation is required by the speaker phone 24 because of environmental conditions, including echoes from walls. The electrical echo cancellation is used to eliminate the return echo that occurs from a discontinuity found on the phone line 16. Commonly a discontinuity is the result of switching from a two wire line to a four wire line.

The echo canceling and duplexing circuit 23 also provides full duplexing capability for the speaker phone 24. Normally, speaker phones are half duplex, which only allows one person to talk at a time. This is necessary to prevent feedback between the speaker and the microphone of the speaker phone 24. The echo canceling and duplexing circuit 23 detects any feedback and removes it before it is received by the other party. This allows for full duplex capability like that provided by a standard telephone handset.

A routing and switching circuit 25 is connected to the echo cancellation circuit 23, which can cross connect a call from the phone line 16, the speaker phone 24, the portable units 18 or a voice messaging system 26. A DTMF generation and detection circuit 28, in one embodiment provides dial tone and ring signal generation. This allows one portable unit 18 to have dial tone when calling a second portable unit 18 and also provides the ring signal to the second portable unit 18. In another embodiment, dial tone and ring signal generation are not provided by the DTMF generation and detection circuit 28 and a call between portable units 18 is placed like a standard cellular telephone call.

The voice messaging system 26 can perform all the normal functions of a voice mail system, such as answering phones, recording voice messages, replaying voice messages, and providing a plurality of voice mail boxes having access codes. The access codes are entered by a telephone keypad or a portable unit's 18 keypad. Pressing a key on the keypad creates a dual tone multi-frequency (DTMF) signal which is detected by a DTMF generation and detection circuit 28. The DTMF generation and detection circuit 28 also generates DTMF signals for phone calls placed over the phone line 16, which the PSTN uses in routing the call to the appropriate party. Alternatively, a voice recognition circuit 30 can be used to limit access to voice mail boxes. The voice recognition circuit 30 could also be used to place calls by just saying the number you wished to call. Authorization to use the personal base 12 could be verified using the voice recognition circuit 30.

A wireless interface 32 connects the portable units 18 to the personal base 12. The wireless interface 32 formats and modulates/demodulates signals going to and coming from the portable units 18. The wireless interface 32 is connected to the routing and switching circuit 25, which performs audio switching and routing in the base 12.

Figure 3:
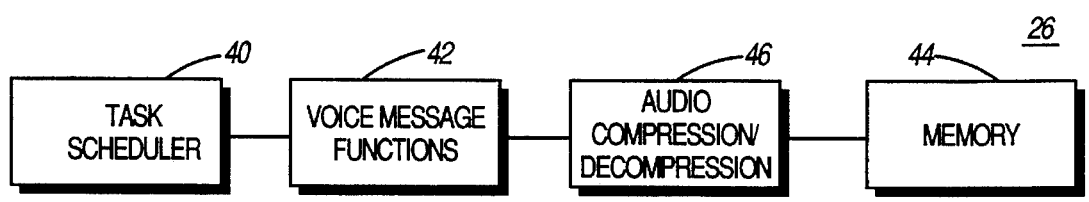
FIG. 3 is a block diagram of the voice messaging system of the personal base station shown in FIG. 2.

The voice messaging system 26, see FIG. 3, has a task scheduler 40, which acts as a controller for a plurality of voice message functions 42 provided by the voice messaging system 26. The voice message function 42 usually requires storing or playing a voice message, which requires storing or recalling the voice message from a memory 44. To accurately store a voice message requires large amounts of memory. To reduce the amount of memory needed, by the voice message system 26, an audio compression/decompression circuit 46 is used. The audio compression/decompression circuit 46 implements an encoding algorithm, preferably the VSELP (vector sum excited linear predictor) algorithm.

Figure 4:
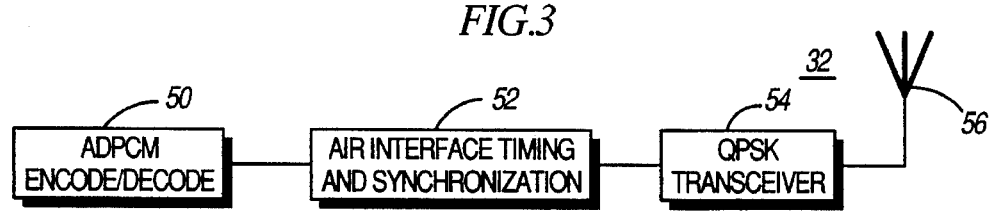
FIG. 4 is a block diagram of the wireless interface of the personal base station shown in FIG. 2.

The wireless interface 32 is shown in more detail in FIG. 4. The codecs 22, as stated earlier, digitize all incoming voice and data signals. The digitized signals are in a format called linear PCM (pulse coded modulation). In order to reduce the bandwidth requirements, the linear PCM is encoded into adaptive PCM (ADPCM) by a ADPCM encode/decode circuit 50. ADPCM only requires 32 Kbits of bandwidth or 16 Kbits for half rate ADPCM, which reduces the bandwidth requirements by a third or more. The voice signal data is then formatted for the Time Division Multiple Access (TDMA) multiplexing scheme used by the system personal phone expansion 10. This is accomplished by the air interface timing and synchronization circuit 52. From there the data is then modulated by a QPSK transceiver 54 which places the modulated signal on the antenna 56 for transmission to the portable units 18.

Figure 5:
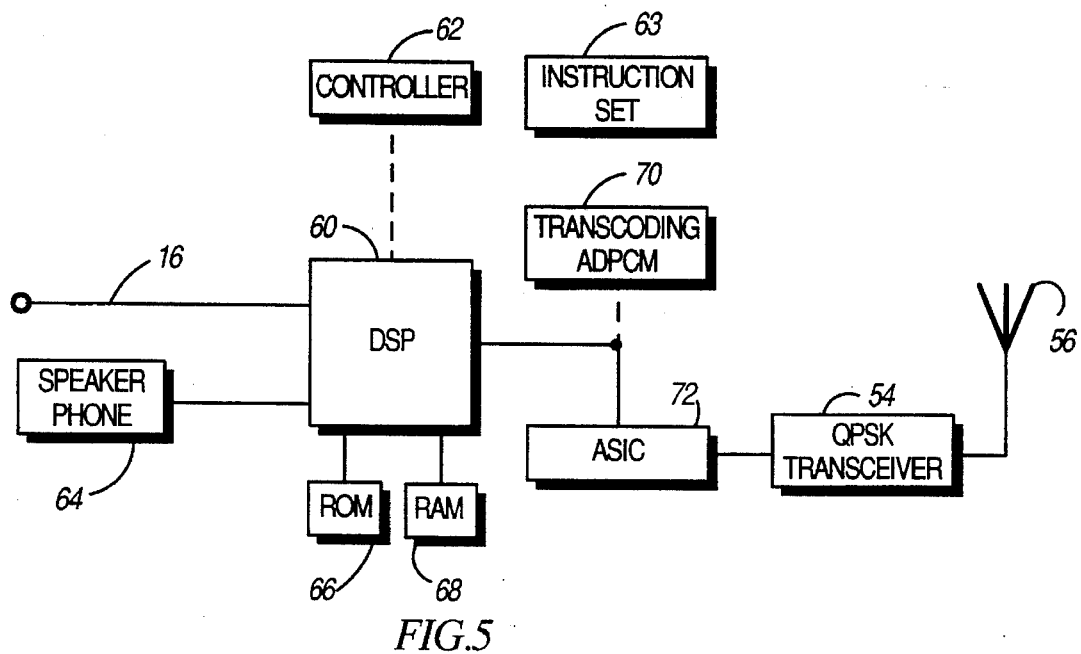
FIG. 5 is a block diagram of an alternative embodiment of the personal base station of FIG. 2 configured in accordance with the present invention.

FIG. 5 shows a block diagram of an alternative embodiment of the personal base station 12 configured in accordance with the invention. The heart of the personal base station 12 is a digital signal processor (DSP) integrated circuit (IC) 60. The DSP 60 is a specialized processing IC that is designed to perform waveform processing functions extremely efficiently. The personal base station 12 may include a controller IC 62, which coordinates and controls the activities of the DSP 60 and the other hardware in the personal base 12. If a more powerful DSP 60 is used the function performed by the controller 62 can be done by the DSP 60. The DSP 60 and controller 62 have an instruction set 63, which cause the DSP 60 and the controller 62 to perform the functions required by the system personal phone expansion 10. These functions include codecs 22, echo canceling and duplex 23, routing and switching 25, DTMF and generation detection 28, voice recognition 30, voice messaging 26 except for memory 44, and ADPCM transcoding 50.

A phone line 16 is shown connected to the DSP 60. A built in speaker phone 64 is also connected to the DSP 60. Memory for voice messages is provided by a ROM (read only memory) 66 and a RAM (random access memory) 68. The RAM 68 is used for storing the messages left in voice mail boxes. The ROM 66 is used for storage of phonemes, elemental units of speech, which are used by the DSP 60 to generate user messages. The personal base station 12 may include an ADPCM transcoder 70, however this function can be performed by the DSP 60, if the DSP 60 has enough power after meeting the other system requirements. An application specific integrated circuit (ASIC) 72 is used to format the data for the TDMA multiplexing scheme used by the personal base 12. Once the data is formatted it is modulated by a QPSK transceiver 54 and placed on the antenna 56 for transmission to the portable units 18.

Figure 6:
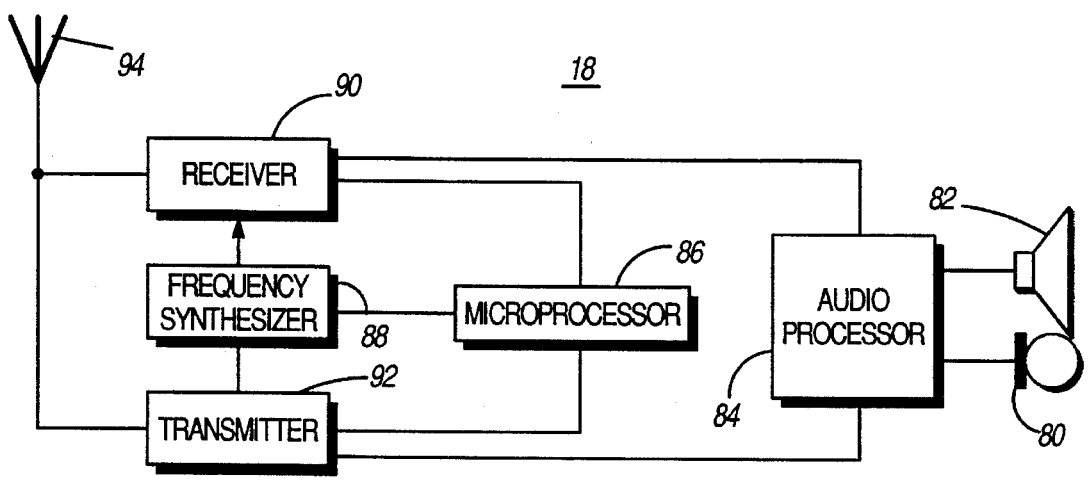
FIG. 6 is a block diagram of a portable unit of the personal phone expansion system shown in FIG. 1.

A block diagram of the portable unit 18 is shown in FIG. 6. The portable unit 18 has a microphone 80 and a speaker 82, both of which are connected to an audio processor 84. The audio processor 84 does the analog to digital and digital to analog conversions. It also encodes the outgoing voice signal data into ADPCM and formats the data for the TDMA multiplexing scheme. A microprocessor 86 controls a frequency synthesizer 88 which generates the local oscillator LO for a receiver 90 or the carrier for a transmitter 92. The transmitter 92 and the receiver 90 are connected to an antenna 94. A duplexer is not required because the portable unit 18 uses time division duplexing, so that it is only transmitting at a given time slot and only receiving at a different time slot.

With this system a user can significantly expand his home telephone service. Using a single phone line 16 the user can have up to four portable units 18. All four portable units 18 can participate in a single phone call over the phone line 16. Or the single phone line 16 can only be used by one of the portable units 18, while a second portable unit 18 can be used to check or leave voice mail messages. Yet a third portable unit 18 could place a call to the speaker phone 24 or to the fourth portable unit 18. If the user desires to leave the range of his personal base station 12 with one of the portable units 18, they are equipped to communicate over the cellular telephone system. As a result the user only needs a single telephone to be reachable anywhere.

In one embodiment, the personal base 12 can support two portable units 18. When a third portable unit 18 is added an ADPCM IC 70 is added to the personal base station 12. If a fourth portable unit 18 is desired a second ADPCM IC 70 is added to the personal base 12. This makes the system 10 easily scalable for additional portable units 18.

Besides acting as a sort of personal PBX the personal phone expansion system 10 provides the user with full voice mail capabilities using the voice messaging system 26. The system 10 can optionally be equipped with voice recognition capabilities 30 also. All of this is contained in a single personal base 12 and the associated portable units 18.

A telephone expansion system has been described which expands the number of usable handsets, acts as a speaker phone and provides voice mail capability. The system replaces a user's answering machine, portable phone and wall phone, and provides capabilities not found in any of these devices.

To those skilled in the art it is obvious that many modifications can be made to the invention without departing from the spirit of the invention. For instance, the personal base station 12 could be adapted for two phone lines. Or the DSP 60 could be replaced with a reduced instruction set code integrated circuit (RISC). Any such modification is considered to be part of the inventor's exclusive rights in this invention. For a full understanding of the scope of the invention reference should be made to the appended claims.

We claim:

1. A personal base station for routing an analog call originating from a means for sending an analog call communicatively coupled with the personal base station, and further for routing a modulated call originating from any one of a plurality of portable units communicatively coupled with the personal base station, the personal base station comprising:

a codec, coupled with the means for sending an analog call, for receiving the analog call, digitizing the analog call to create a digitized analog call, and forwarding the digitized analog call;

a wireless interface for receiving the modulated call, digitizing the modulated call to create a digitized modulated call, and forwarding the digitized modulated call;

a digital voice messaging system; and a digital routing and switching circuit, coupled with the digital voice messaging system, the codec, and the wireless interface, for receiving the digitized analog call from the codec and routing the digitized analog call to the digital voice messaging system or the wireless interface, and further for receiving the digitized modulated call from the wireless interface and routing the digitized modulated call to the digital voice messaging system or the codec;

wherein the digital voice messaging system for receiving the digitized analog call and the digitized modulated call from the digital routing and switching circuit, storing the digitized analog call and the digitized modulated call as digitized messages, and forwarding the digitized messages;

wherein the digital routing and switching circuit further for receiving the digitized messages from the digital voice messaging system and routing the digitized messages to the codec or the wireless interface, and further for routing the digitized modulated call received from the wireless interface back to the wireless interface for transmission to any one of the plurality of portable units except the portable unit that originated the modulated call.

2. The personal base station of claim 1 wherein the means for sending an analog call is a speaker phone of the personal base station.

3. The personal base station of claim 1 wherein the wireless interface includes an adaptive pulse coded modulation (ADPCM) encode/decode circuit for each one of the plurality of portable units, and the personal base station is expandable by adding an additional ADPCM encode/decode circuit but not an additional codec for each added portable unit of the plurality of portable units.

4. The personal base station of claim 1 wherein the means for sending an analog call is a Public Switch Telephone Network (PSTN).

5. The personal base station of claim 4 wherein the digital routing and switching circuit is capable of simultaneously coupling the PSTN with up to a predetermined number of any portable units of the plurality of portable units, whereby the predetermined number of any four portable units can participate in a single call over the PSTN.

6. The personal base station of claim 4 wherein the digital routing and switching circuit is capable of coupling the PSTN with a first portable unit of the plurality of portable units while coupling a second portable unit of the plurality of portable units with the digital voice messaging system, whereby a first call can take place between the PSTN and first portable unit while a second call can simultaneously take place between the second portable unit and the digital voice messaging system.

7. The personal base station of claim 6 wherein the digital routing and switching circuit is further capable of coupling a third portable unit of the plurality of portable units with a fourth portable unit of the plurality of portable units, whereby a third call can simultaneously take place between the third portable unit and the fourth portable unit while the first call and second call are simultaneously taking place.

8. The personal base station of claim 1 wherein at least one of the plurality of portable units is capable of communicating over a cellular network.

* * * * *

UNITED STATES PATENT AND TRADEMARK OFFICE
CERTIFICATE OF CORRECTION

PATENT NO. : 5,528,666
DATED : June 18, 1996
INVENTOR(S) : Weigand et al.

It is certified that error appears in the above-indentified patent and that said Letters Patent is hereby corrected as shown below:

In column 2, line 18, please delete the comma after the word "Network".

In column 3, lines 47-48, please replace "system personal phone expansion" with --personal phone expansion system--.

In column 3, lines 66-67, please replace "system personal phone expansion" with --personal phone expansion system--.

Signed and Sealed this

Twenty-ninth Day of October 1996

Attest:

BRUCE LEHMAN

Attesting Officer

Commissioner of Patents and Trademarks